(12) United States Patent
Adir

(10) Patent No.: US 12,038,332 B2
(45) Date of Patent: Jul. 16, 2024

(54) TORCH BASE INCLUDING INTEGRATED TEMPERATURE MEASUREMENT AND CONTROL CAPABILITIES

(71) Applicant: Ilan Daniel Adir, South Miami, FL (US)

(72) Inventor: Ilan Daniel Adir, South Miami, FL (US)

( * ) Notice: Subject to any disclaimer, the term of this patent is extended or adjusted under 35 U.S.C. 154(b) by 469 days.

(21) Appl. No.: 17/494,123

(22) Filed: Oct. 5, 2021

(65) Prior Publication Data

US 2022/0107225 A1    Apr. 7, 2022

Related U.S. Application Data

(60) Provisional application No. 63/088,284, filed on Oct. 6, 2020.

(51) Int. Cl.
*G01K 1/143* (2021.01)
*F23D 14/46* (2006.01)
*G01K 3/00* (2006.01)

(52) U.S. Cl.
CPC .............. *G01K 1/143* (2013.01); *G01K 3/005* (2013.01); *F23D 14/465* (2013.01)

(58) Field of Classification Search
CPC ....... G01K 1/143; G01K 3/005; F23D 14/465
See application file for complete search history.

(56) References Cited

U.S. PATENT DOCUMENTS

| | | | | |
|---|---|---|---|---|
| 2013/0264315 | A1* | 10/2013 | Hung | B23K 9/0956 219/136 |
| 2021/0116304 | A1* | 4/2021 | Wynick | G01J 5/0014 |
| 2022/0151306 | A1* | 5/2022 | Santos | A24F 42/60 |

OTHER PUBLICATIONS

Dab Rite digital IR Thermometer; accessed on Oct. 2, 2021; 6 pages; Dabrite.com.
TempTech Flex; accessed on Oct. 2, 2021; 4 pages; https://temptech.org/products/temptech-flex?variant=39574644752493.

* cited by examiner

*Primary Examiner* — Mirellys Jagan
(74) *Attorney, Agent, or Firm* — Young Basile Hanlon & MacFarlane, P.C.

(57) ABSTRACT

A torch base is disclosed that is configured to receive and support a (hand-held) torch (e.g., a butane torch) during a variety of activities. The torch base includes: a body; a temperature reader (gauge); and a control unit. The body is configured for releasable connection to a torch and includes a receptacle defining a chamber that is configured to removably receive the torch such that the torch is repeatably connectable to and disconnectable from the body (e.g., via insertion into and removal from the receptacle). The temperature reader (gauge) is connected to the body and is configured to measure a surface temperature (of the article being heated by the torch). The control unit is supported by the body and is in communication with the temperature reader. The control unit is configured to display the surface temperature measured by the temperature reader, which provides a safeguard against overheating of the article.

20 Claims, 6 Drawing Sheets

TORCH BASE INCLUDING INTEGRATED TEMPERATURE MEASUREMENT AND CONTROL CAPABILITIES

CROSS-REFERENCE TO RELATED APPLICATION(S)

This application claims the benefit of, and priority to, U.S. Provisional Patent Application Ser. No. 63/088,284, filed on Oct. 6, 2020, the entire contents of which are hereby incorporated by reference.

TECHNICAL FIELD

The present disclosure relates to a base for a (hand-held) torch. More specifically, the present disclosure relates to a torch base that includes integrated temperature measurement and control capabilities.

BACKGROUND

Torches are used in a wide variety of industries, including, for example, food and food service, baking, glass blowing, *Cannabis* utilization, metal working, etc. While torch bases and handheld temperature readers exist, they are made available as stand-alone, separate units, which complicates use and often results in user error (e.g., overheating).

To address this deficiency, the present disclosure describes a torch base that includes integrated temperature measurement and control capabilities.

SUMMARY

In one aspect of the present disclosure, a torch base is disclosed that includes: a body; a temperature reader (gauge); and a control unit. The body is configured for releasable connection to a torch and includes a receptacle defining a chamber that is configured to removably receive the torch such that the torch is repeatably connectable to and disconnectable from the body (e.g., via insertion into and removal from the receptacle). The temperature reader (gauge) is connected to the body and is configured to measure a surface temperature (of the article being heated by the torch). The control unit is supported by the body and is in communication with the temperature reader. The control unit is configured to display the surface temperature measured by the temperature reader, which provides a safeguard against overheating of the article.

In certain embodiments, the control unit may include a plurality of control buttons to allow for the input of a target temperature.

In certain embodiments, the control unit may be configured to provide an alert when the surface temperature measured by the temperature reader reaches the target temperature. For example, it is envisioned that the control unit may be configured to provide a visual alert and/or an audible alert.

In certain embodiments, the temperature reader may include a variable length.

In certain embodiments, the body may include a lower housing and an upper housing that is configured for releasable connection to the lower housing.

In certain embodiments, the upper housing may define the receptacle.

In certain embodiments, the lower housing may include at least one retention member that is configured for contact (engagement) with the torch during insertion.

In certain embodiments, the lower housing may include a resilient material to allow for deflection of the at least one retention member between a normal position and a deflected position during insertion of the torch.

In certain embodiments, the at least one retention member may apply an inwardly-directed retention force to the torch in the deflected position to thereby secure the torch within the receptacle.

In certain embodiments, the lower housing and the upper housing may each be unitary in construction.

In certain embodiments, the upper housing may define an internal cavity that is located adjacent to the receptacle such that the at least one retention member moves through the internal cavity during deflection.

In certain embodiments, the lower housing may include a plurality of retention members that are spaced (approximately) equidistant from each other.

In certain embodiments, the receptacle may include a sidewall defining at least one aperture that is configured to receive the at least one retention member such that the at least one retention member extends into the chamber to facilitate contact (engagement) between the at least one retention member and the torch during insertion.

In another aspect of the present disclosure, a torch base is disclosed that includes: a body; a temperature reader (gauge); and a control unit. The body is configured for releasable connection to a torch and includes at least one retention member that is configured for resilient repositioning between a normal position and a deflected position. In the normal position, the at least one retention member is positioned for contact (engagement) with the torch, and in the deflected position, the at least one retention member contacts (engages) the torch and applies an inwardly-directed retention force thereto to secure the torch in relation to the body. The temperature reader is connected to the body and is configured to measure a surface temperature (of the article being heated by the torch). The control unit is supported by the body and is in communication with the temperature reader. The control unit is configured to display the surface temperature measured by the temperature reader, which inhibits (if not entirely prevents) overheating of the article.

In certain embodiments, the body may include a receptacle defining a chamber that is configured to removably receive the torch.

In certain embodiments, in the normal position, the at least one retention member may extend into the chamber to facilitate contact (engagement) with the torch during insertion (e.g., into the receptacle).

In certain embodiments, the body may include at least one aperture that is configured to receive the at least one retention member such that the at least one retention member extends into the chamber through the at least one aperture.

In certain embodiments, the body may include an upper housing and a lower housing.

In certain embodiments, the upper housing may include (define) the receptacle and the lower housing may include (define) the at least one retention member.

In certain embodiments, the upper housing and the lower housing may each be unitary in construction.

In another aspect of the present disclosure, a torch base is disclosed that includes: a body; a temperature reader (gauge); and a control unit. The body is configured for releasable connection to a torch and includes an upper housing and a lower housing. The upper housing includes a receptacle defining a chamber that is configured to removably receive the torch, and the lower housing includes a plurality of deflectable fingers that are configured for engagement with the torch during insertion (e.g., into the receptacle) to thereby secure the torch within the torch base. The temperature reader is connected to the body and is configured to measure a surface temperature (of the article being heated by the torch). The control unit is supported by the body and is in communication with the temperature reader. The control until is configured to display the surface temperature measured by the temperature reader, which inhibits (if not entirely prevents) overheating of the article.

In certain embodiments, the receptacle may include a sidewall defining a plurality of apertures that are configured to receive the plurality of deflectable fingers such that the plurality of deflectable fingers extend into the chamber to facilitate engagement with the torch during insertion.

In certain embodiments, the upper housing and the lower housing may each be unitary in construction.

BRIEF DESCRIPTION OF THE DRAWINGS

The present disclosure is best understood from the detailed description that follows when read in conjunction with the accompanying drawings. It is emphasized that, according to common practice, the various features of the drawings may not be to-scale. On the contrary, the dimensions of the various features may be arbitrarily varied for clarity.

DETAILED DESCRIPTION

The present disclosure relates to a torch base that is configured to receive and support a (hand-held) torch (e.g., a butane torch) during a variety of activities. The torch base includes integrated temperature measurement and control capabilities that are supported (facilitated) by a temperature reader (gauge), which is configured to measure the surface temperature of the article (or other such object) being heated by the torch, and a control unit, which communicates with the temperature reader and displays the surface temperature measured by the temperature reader (e.g., to provide a safeguard against overheating of the article). To allow for repeated connection and disconnection of the torch base and the torch, the torch base includes a receptacle, which defines a chamber that is configured to removably receive the torch.

In one embodiment of the disclosure, the torch base includes a body with upper and lower housings. The upper housing defines the receptacle, and the lower housing includes one or more retention members (e.g., fingers) that are configured for contact (engagement) with the torch during insertion into the torch base (e.g., the receptacle). The lower housing includes a resilient material, which allows for deflection of the retention member(s) between a normal position and a deflected position during insertion of the torch. In the deflected position, the retention member(s) apply an inwardly-directed retention force to the torch to thereby secure the torch within the torch base.

Figure 1:
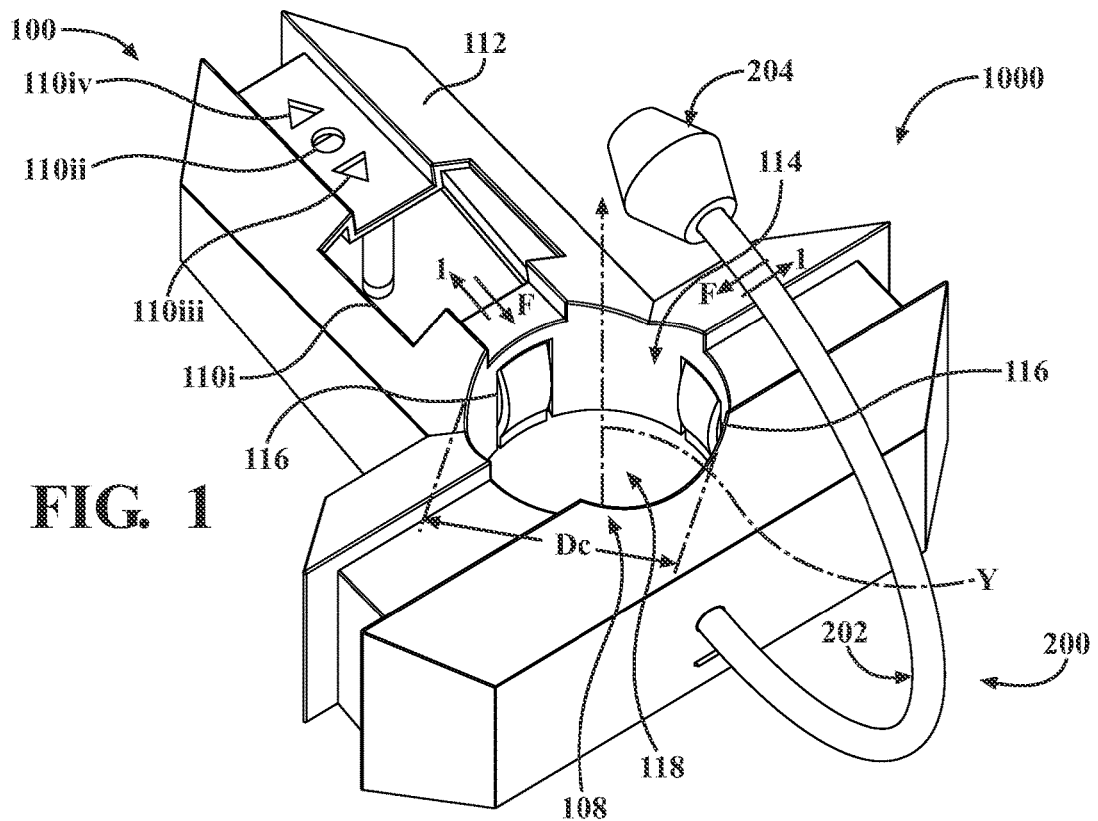
FIG. 1 is a top, perspective view of a torch base in accordance with one embodiment of the present disclosure.
Figure 2:
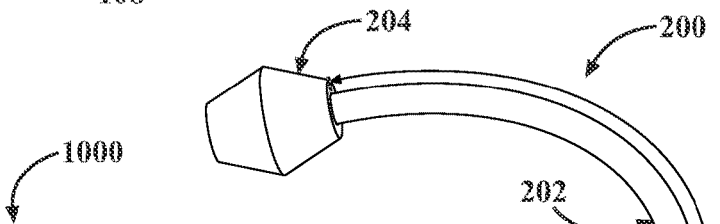
FIG. 2 is a bottom, perspective view of the torch base.
Figure 2:
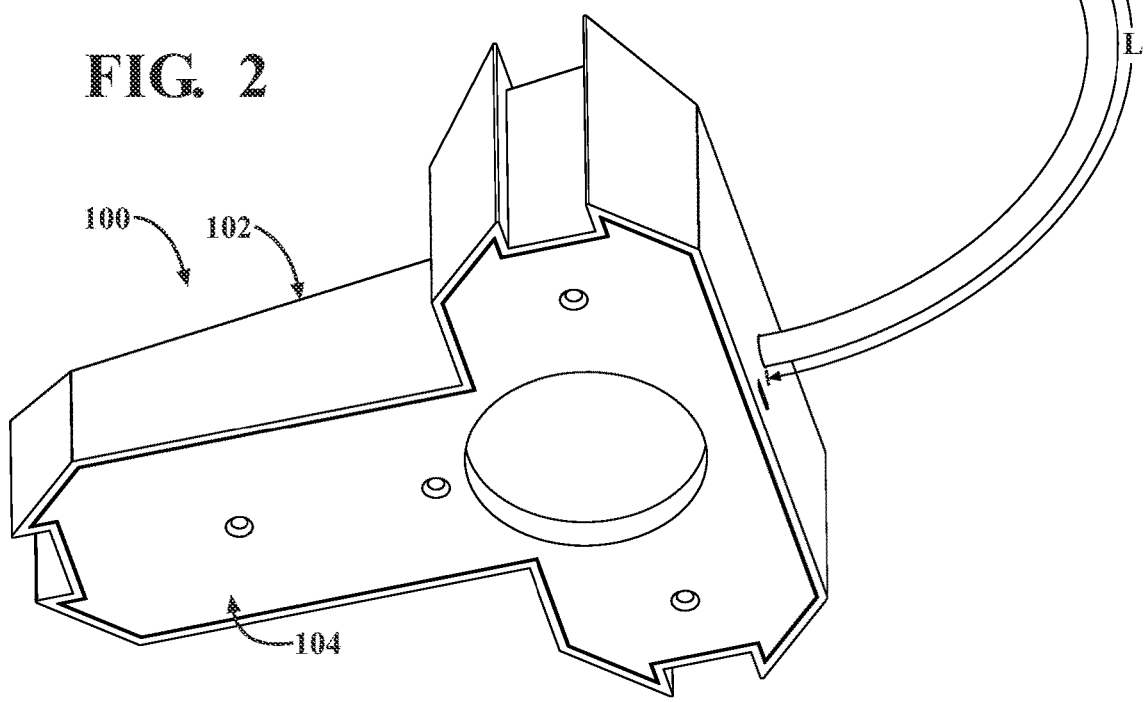
Figure 3:
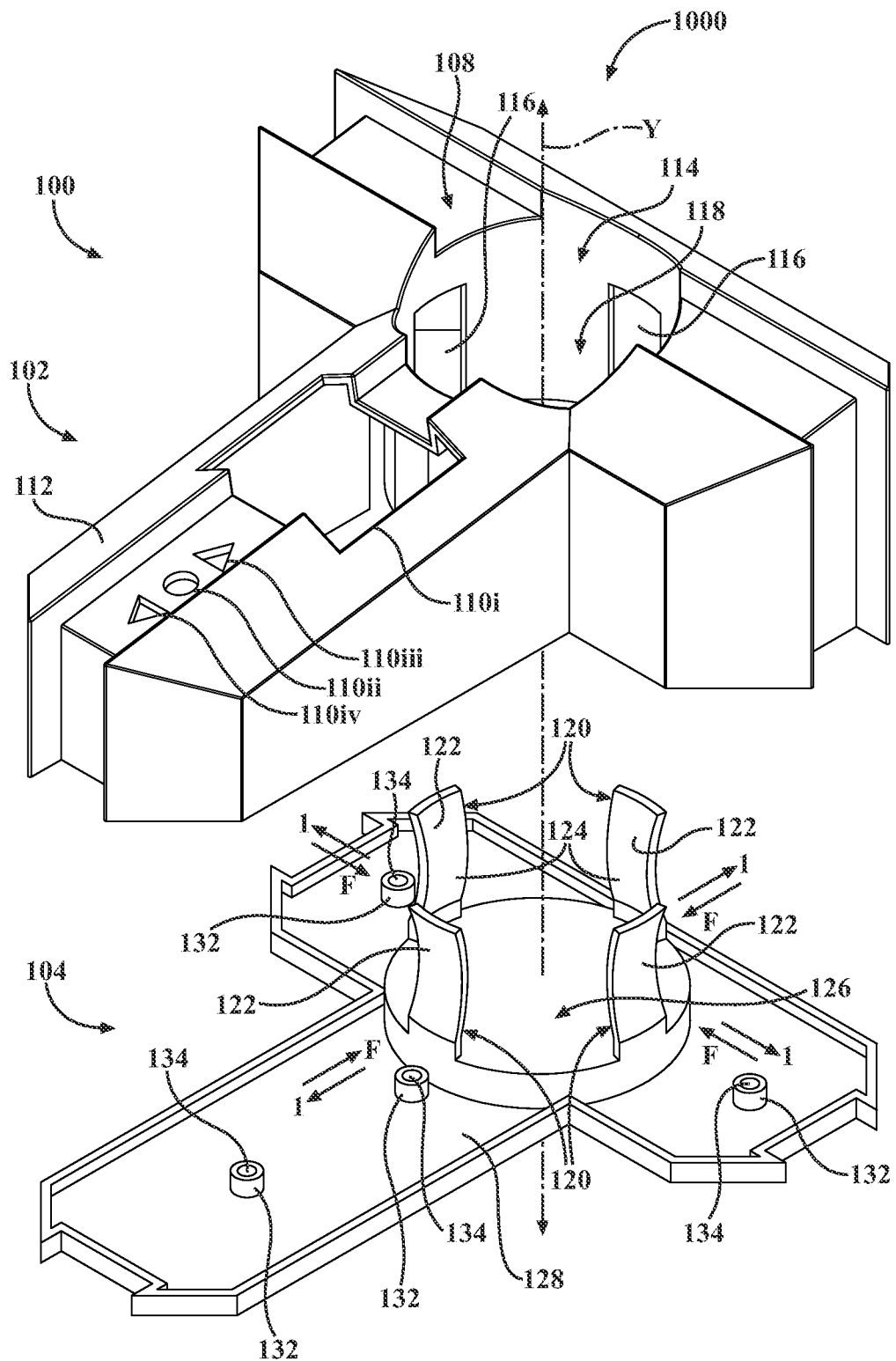
FIG. 3 is a partial, top, perspective view of the torch base shown with parts separated.
Figure 4:
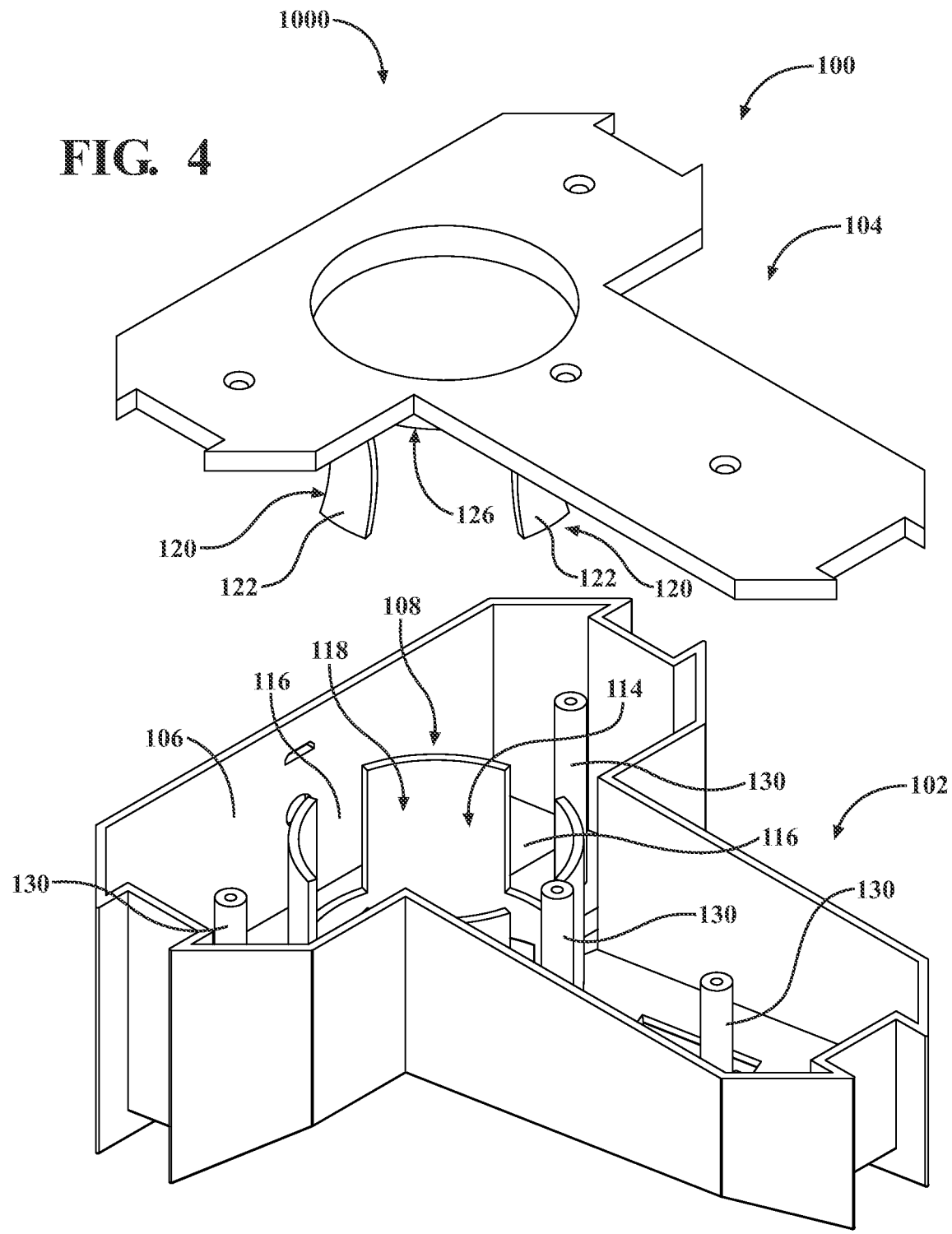
FIG. 4 is a partial, bottom, perspective view of the torch base shown with parts separated.
Figure 5:
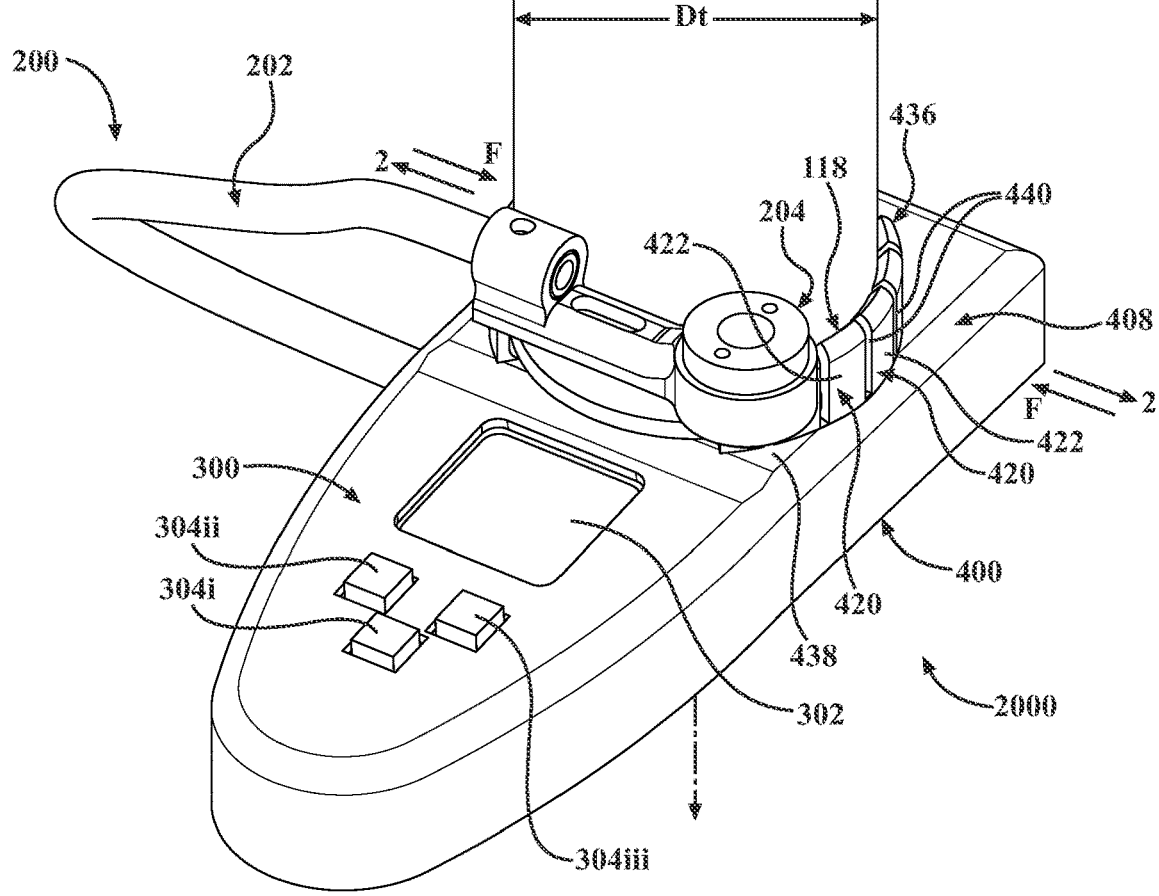
FIG. 5 is a front, perspective view of a torch base in accordance with another embodiment of the present disclosure.
Figure 6:
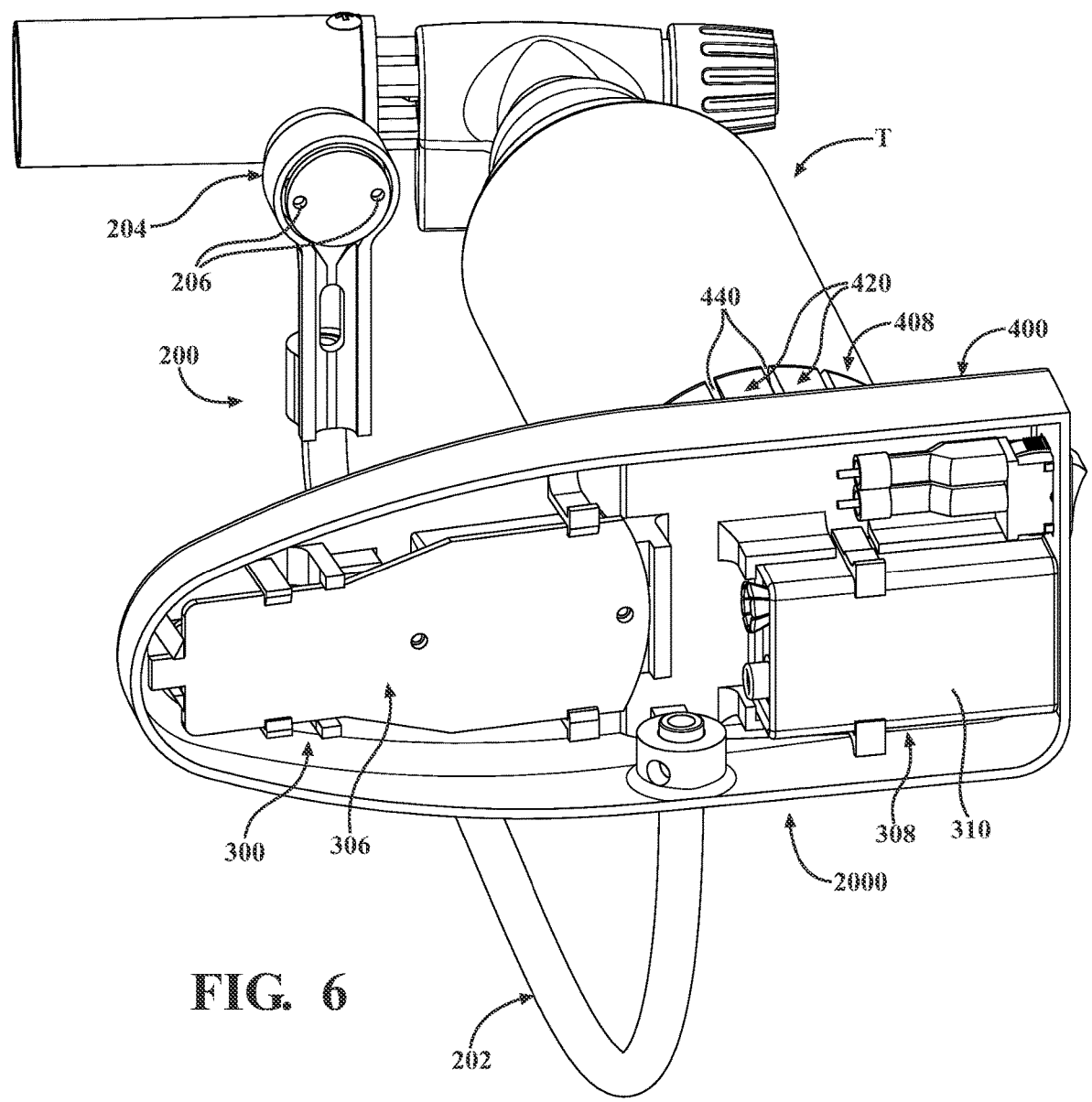
FIG. 6 is a bottom, perspective view of the torch base seen in FIG. 5.

Referring now to the drawings, FIGS. 1-4 illustrate one embodiment of the presently disclosed torch base 1000, which includes integrated temperature measurement and control capabilities. Although generally illustrated and described in connection with a butane torch T (FIGS. 5, 6), it should be appreciated that the torch base 1000 may be configured for use with a wide variety of torches T (or other such heat sources) that may vary in size, capacity, configuration, fuel type, and/or intended use. As described in detail below, the torch base 1000 includes a body 100; a temperature reader (gauge) 200; and a control unit 300 (FIGS. 5, 6).

The body 100 includes respective upper and lower (first and second) housings 102, 104, and is configured for releasable connection to (engagement with) the torch T, which allows for repeated connection and disconnection of the torch T and the torch base 1000 (e.g., insertion and removal of the torch T). The body 100 may include (e.g., may be formed from) any suitable material or combination of materials, whether metallic or non-metallic (e.g., one or more plastic materials, polymeric materials, composite materials, etc.), and may be formed through any suitable method of manufacture (e.g., 3-D printing, injection molding, etc.).

The upper housing 102 includes: an internal cavity 106 (FIG. 4); a receptacle 108; and one or more windows 110 that are formed in an upper (outer) wall 112 of the upper housing 102. The internal cavity 106 extends into the upper housing 102, which reduces the overall weight of the torch base 1000 and facilitates assembly of the respective upper and lower housings 102, 104, as described in further detail below. In the particular embodiment seen in FIGS. 1-4, the internal cavity 106 defines a (generally) T-shaped transverse cross-sectional configuration, which corresponds to those defined by the respective upper and lower housings 102, 104. It should be appreciated, however, that the particular geometrical configuration of the internal cavity 106, as well as those of the respective upper and lower housings 102, 104, may be varied in alternate embodiments without departing from the scope of the present disclosure.

The receptacle 108 extends axially inward into the body 100 along a longitudinal axis Y (FIGS. 1, 3) and allows for insertion and removal of the torch T during connection to and disconnection from the torch base 1000. The receptacle 108 includes a sidewall 114 and nests within the internal cavity 106 such that the internal cavity 106 is located adjacent to the receptacle 108 and extends laterally (radially) outward therefrom. The sidewall 114 includes one or more apertures (openings) 116 and defines a chamber 118 that is configured to accommodate (receive) the torch T in a (generally) upright (e.g., vertical) orientation, which facilitates hands-free use of the torch T. The chamber 118 defines a transverse cross-sectional dimension (e.g., a diameter) Dc (FIG. 1) that is less than a corresponding transverse cross-sectional dimension (e.g., a diameter) Dt (FIG. 5) defined by the torch T, which allows for secured engagement of the torch T by the torch base 1000, as described in further detail below. It should be appreciated that the particular dimension Dc defined by the chamber 118 may be altered in various embodiments of the disclosure to allow for use of the torch base 1000 with a wide variety of torches T.

Although shown as including a single receptacle 108 with a (generally) annular (e.g., circular) transverse cross-sectional configuration in the particular embodiment seen in FIGS. 1-4, it should be appreciated that the particular number of receptacles 108 and/or the configuration of the receptacle(s) 108 may be varied in alternate embodiments without departing from the scope of the present disclosure. For example, it is envisioned that the torch base 1000 may include a non-annular receptacle 108 (e.g., depending upon the particular cross-sectional configuration of the torch T) and/or that the torch base 1000 may include two or more receptacles 108 (e.g., to allow for use of the torch base 1000 with a plurality of torches T), which may be either identical or non0-identical in configuration.

The window(s) 110 accommodate the control unit 300 and support operation thereof. More specifically, in the particular embodiment seen in FIGS. 1-4, the upper housing 102 includes: a (first) window 110$i$ that is configured to receive a display screen 302 (FIG. 5); a (second) window 110$ii$ that is configured to receive a (first) control (power) button 304$i$ (FIG. 5) to activate the temperature reader 200 and/or the control unit 300; and (third and fourth) windows 110$iii$, 110$iv$ that are configured to respectively receive control buttons 304$ii$, 304$iii$ (FIG. 5). It should be appreciated, however, that the particular number of windows 110 (and/or the particular location of the windows 110) may be varied in alternate embodiments without departing from the scope of the present disclosure. As such, embodiments including both greater and fewer numbers of window 110 are envisioned herein (e.g., depending upon the particular configuration of the control unit 300, the functionality of the control unit 300, the number of control buttons 304, etc.).

The lower housing 104 includes one or more retention members 120 (e.g., fingers 122) that are configured for contact (engagement) with the torch T during connection of the torch T to the torch base 1000. To facilitate contact (engagement) with the torch T, the retention members 120 include a non-linear (e.g., arcuate) configuration. More specifically, the retention members 120 each include a convex configuration that extends inwardly (e.g., towards the chamber 118 and the torch T) so as to define curved guide surfaces 124 (FIG. 3) that direct the torch T into the chamber 118.

The retention member(s) 120 correspond in both configuration and number to the apertures 116 extending into (e.g., through) the sidewall 114 of the receptacle 108. In the particular embodiment seen in FIGS. 1-4, the torch base 1000 includes four retention members 120 and four apertures 116 that are separated by (approximately) 90° such that adjacent retention members 120 and adjacent apertures 116 are spaced (approximately) equidistant from each other. It should be appreciated, however, that the particular number of retention members 120 and apertures 116, and the location (spacing) thereof, may be varied without departing from the scope of the present disclosure. As such, embodiments including both greater and fewer numbers of retention members 120 and apertures 116 are envisioned herein. For example, in one particular embodiment, it is envisioned that the torch base 1000 may include a single retention member 120 and a single aperture 116 (e.g., to reduce costs, complexity, etc., of the torch base 1000).

During insertion of the torch T into the receptacle 108, the retention members 120 are moved from a normal (initial) position (configuration) (FIG. 1) into a deflected (subsequent) position (configuration). In the normal position, the retention members 120 extend through the sidewall 114 of the receptacle 108 and into the chamber 118, which facilitates contact (engagement) with the torch T. Upon contact (engagement) with the torch T, as the torch T is advanced into the receptacle 108 (e.g., the chamber 118), the retention members 120 are deflected (displaced) radially outward (in the direction indicated by arrows 1 in FIGS. 1, 3) and move through (within) the internal cavity 106 (FIG. 4), which results in the application of an inwardly-directed retention force F to the torch T. The retention force F applied by the retention members 120 secures the torch T within the torch base 1000 to inhibit (if not entirely prevent) unintended (e.g., accidental) relative movement therebetween.

To allow for resilient movement (repositioning) of the retention members 120 between the normal position and the deflected position, the lower housing 104 includes (e.g., is formed partially or entirely from) one or more resilient materials. More specifically, in the particular embodiment of the disclosure seen in FIGS. 1-4, the housings 102, 104 are each unitary (e.g., monolithic, integral) in construction and include identical materials. Embodiments in which the upper housing 102 and/or the lower housing 104 may include a non-unitary construction, however, are also envisioned herein, as are embodiments in which the housings 102, 104 may include dissimilar (e.g., non-identical) materials.

In the particular embodiment of the disclosure seen in FIGS. 1-4, the retention members 120 are secured to (e.g., are formed integrally with) a platform 126 (FIGS. 3, 4) that extends axially (e.g., vertically) from a bottom wall 128 of the lower housing 104 (e.g., along the longitudinal axis Y). The platform 126 supports the torch T upon insertion into the torch base 1000 and increases the strength and/or rigidity of the retention members 120 by increasing the surface area available for contact with the lower housing 104. Embodiments devoid of the platform 126, however, (e.g., embodiments in which the retention members 120 may extend directly from the bottom wall 128 of the lower housing 104) would not be beyond the scope of the present disclosure (e.g., to increase flexibility of the retention members 120).

In the embodiment of the disclosure seen in FIGS. 1-4, the respective upper and lower housings 102, 104 are configured as separate, discrete structures. It should be appreciated, however, that the present disclosure also contemplates embodiments in which the respective upper and lower housings 102, 104 may be integrally (e.g., monolithically, unitarily) formed.

In certain embodiments of the disclosure, such as that seen in FIGS. 1-4, the upper and lower housings 102, 104 include corresponding male and female pins 130, 132 (FIGS. 3, 4), respectively, which facilitate proper alignment of the housing portions 102, 104 during assembly of the body 100. More specifically, the female pins 132 define channels 134 that are configured to receive the male pins 130.

In various embodiments of the disclosure, it is envisioned that the housing portions 102, 104 may be configured for either fixed or releasable connection (e.g., to allow for repeated connection and disconnection during repair and/or maintenance of the torch base 1000). To facilitate releasable connection, it is envisioned that the housing portions 102, 104 may include any suitable engagement members, including, for example, mechanical fasteners (e.g., screws, clips, etc.), or the like. In one particular embodiment, it is envisioned that the pins 130, 132 may include corresponding detents are recesses that are configured for engagement in snap-fit relation.

The temperature reader 200 is connected to the body 100 and is configured to measure the surface temperature of the article (or other such object) being heated by the torch T. More specifically, the temperature reader 200 includes a conduit (arm) 202 that extends into the body 100 (e.g., through the upper housing 102) and a head 204 that is supported by the conduit 202. To measure the surface temperature of the article, the head 204 includes one or more thermal sensors 206 (FIG. 6) (or other such detectors).

In certain embodiments of the disclosure, such as that seen in FIGS. 1-4, it is envisioned that the conduit 202 may include a variable length L (FIG. 2) to allow for greater flexibility during use of the torch base 1000 by facilitating temperature measurement from different heights, angles, positions, etc. To allow for variation in the length L, it is envisioned that the conduit 202 may include one or more expandable (e.g., stretchable) materials or that the conduit 202 may include a plurality of movable segments (e.g., configured in a telescopic arrangement).

The control unit 300 (FIGS. 5, 6) is supported by the body 100 (e.g., between the housing portions 102, 104) and is in communication with the temperature reader 200 such that the surface temperature measured by the head 204 can be displayed by the control unit 300 (e.g., on the display screen 302). The control unit 300 includes an electronics assembly 306 (FIG. 6), which may be connected to any suitable power source 308 (e.g., a battery 310, a wall outlet, etc.), whether internal to the torch base 1000 or external. The control unit 300 is configured to allow a user to input a target (desired) temperature (for the article being heated by the torch T), which may be increased or decreased via the control buttons 304ii, 304iii. In certain embodiments of the disclosure, such as that seen in FIGS. 1-4, the control unit 300 may be configured to provide an alert, which may be visual and/or audible, when the surface temperature measured by the temperature reader 200 reaches the target temperature so as to a provide a safeguard against, and inhibit (if not entirely prevent), overheating of the article by the torch T. It is also envisioned that the control unit 300 may include a timer or other such programmable features to increase operability and utility of the torch base 1000. For example, it is envisioned that the control unit 300 may include support operation of the torch T according to a predetermined temperature cycle. To support such functionality, it is envisioned that the electronics assembly 306 may include any suitable electronic components (e.g., one or more printed circuit boards, microprocessors, etc.).

To further inhibit (if not entirely prevent) overheating of the article by the torch T and/or maintain the target temperature (input by the user), it is envisioned that the torch base 1000 may be configured to control operation of the torch T (e.g., to activate and deactivate the torch T and/or increase and decrease the heat applied thereby) to allow for more precise control over heating of the article. For example, it is envisioned that the torch base 1000 and/or the torch T may include one or more regulators to increase or decrease the supply of fuel (e.g., butane), allow the torch T to follow (adhere to) a predetermined thermal cycle (e.g., depending upon the article being heated), etc., which may be controlled by the electronics assembly 306.

With reference now to FIGS. 5 and 6, another embodiment of the torch base will be discussed, which is identified by the reference character 2000. The torch base 2000 is substantially similar to the torch base 1000 (FIGS. 1-4) in both structure and function. As such, identical reference characters will be used to identify components common to the torch bases 1000, 2000. In the interest of brevity, certain components and features common to the torch bases 1000, 2000 may be omitted from the following discussion.

The torch base 2000 includes a body 400, which supports the temperature reader 200 and the control unit 300 in a manner similar (if not identical) to that discussed above in connection with the torch base 1000. The body 400 defines a receptacle 408 that is configured to accommodate (receive) the torch T such that the torch T is connectable to and disconnectable from the torch base 2000. In contrast to the receptacle 108 discussed above with respect to the torch base 1000, the receptacle 408 extends axially outward from the body 400 (along the longitudinal axis Y).

The receptacle 408 includes an upstanding collar 436, which extends (vertically) upward from an upper (outer) wall 438 of the body 400 so as to define the chamber 118. In the particular embodiment seen in FIGS. 5 and 6, the collar 436 is integrally (e.g., monolithically, unitarily) formed with the body 400. Embodiments are also envisioned, however, in which the body 400 and the collar 436 may be configured as separate, discrete structures that may be secured together in any suitable manner, including, for example, via an adhesive, via one or more mechanical fasteners (e.g., screws, clips, etc.), or the like.

The collar 436 is segmented (e.g., discontinuous) in configuration and includes a plurality of slots 440, which define a plurality of retention members 420 (e.g., fingers 422) that are configured for contact (engagement) with the torch T during connection of the torch T to the torch base 1000. While the retention members 420 are each illustrated as including a (generally) linear configuration, embodiments are also envisioned in which the retention members 420 may include a non-linear (e.g., curved) configuration.

During insertion of the torch T into the receptacle 108, the retention members 420 are deflected (displaced) radially outward (in the direction indicated by arrows 2) and are moved a normal (initial) position (configuration) into a deflected (subsequent) position (configuration) (FIGS. 5, 6), which is facilitated via the inclusion of one or more resilient materials in construction of the body 400, as discussed above in connection with the torch base 1000. In the deflected position, the retention members 420 apply the (aforedescribed) inwardly-directed retention force F to the torch T, which secures the torch T within the torch base 2000 to inhibit (if not entirely prevent) unintended (e.g., accidental) relative movement therebetween.

In certain embodiments of the disclosure, it is envisioned that the retention members 420 may include (angled, chamfered) bearing surfaces to not only guide the torch T into the receptacle 508, but facilitate outward displacement of the retention members 420.

Figure 7:
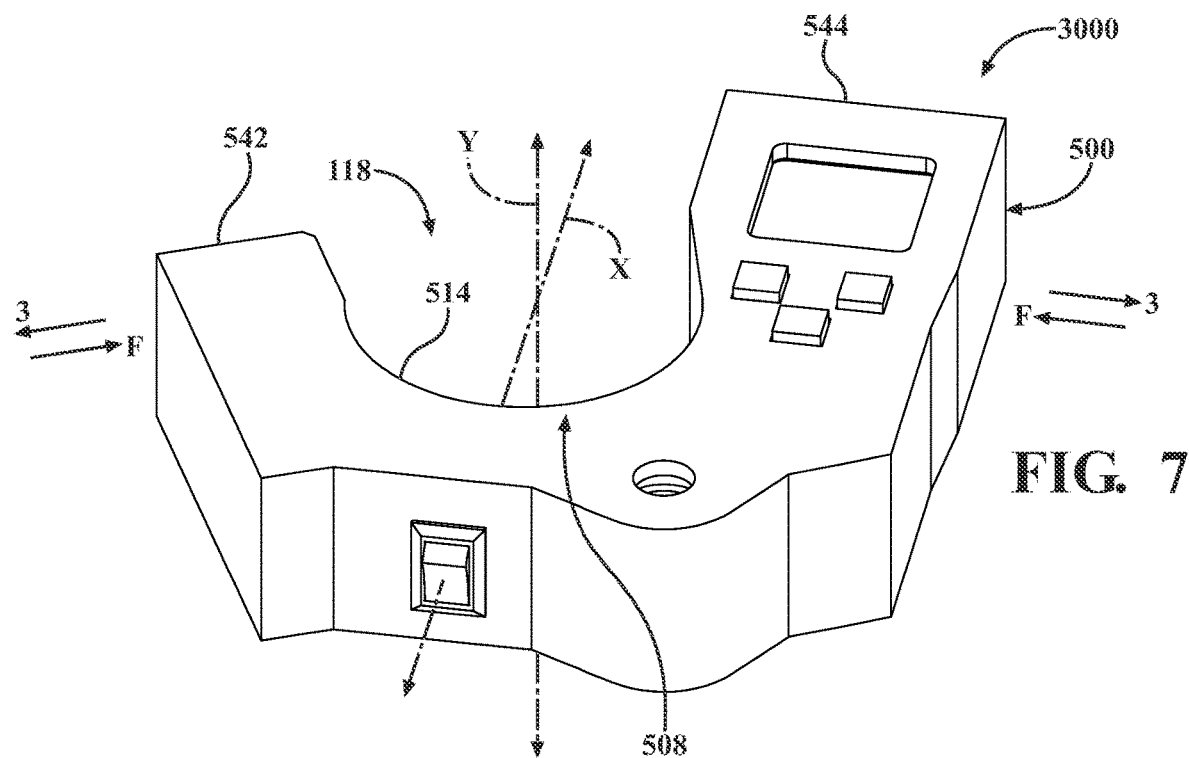
FIG. 7 is a partial, top, perspective view of a torch base in accordance with another embodiment of the present disclosure.
Figure 8:
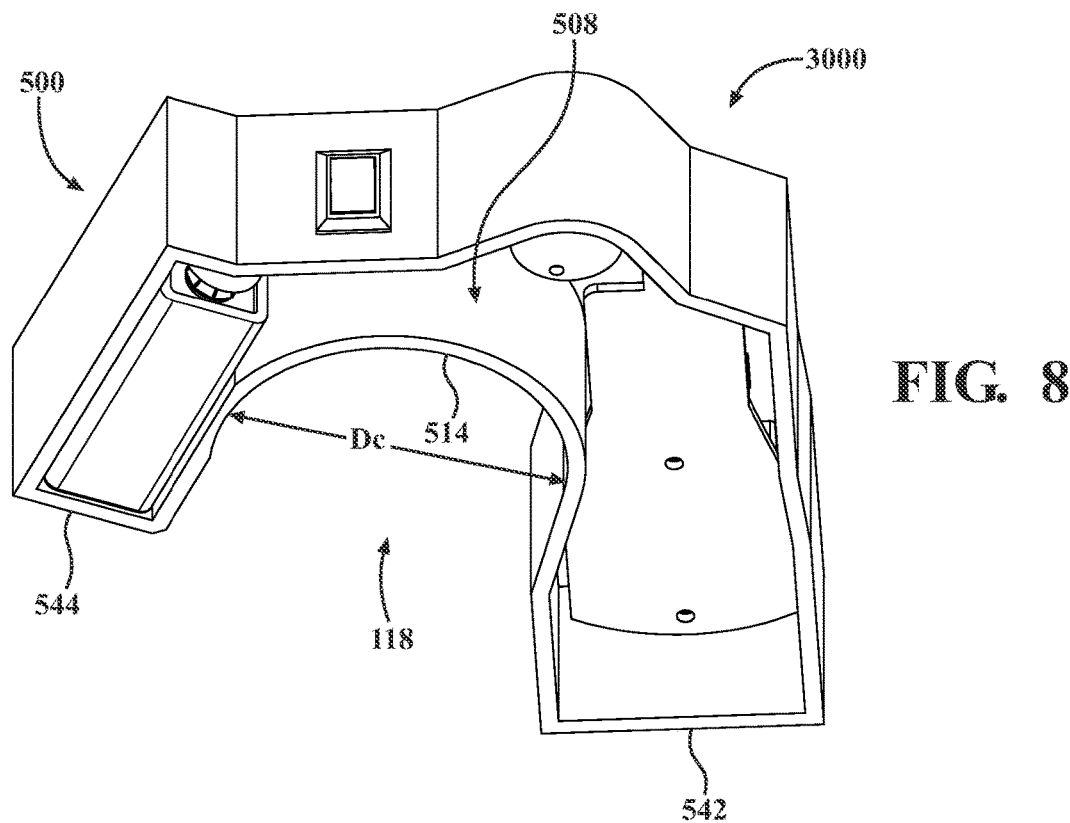
FIG. 8 is a partial, bottom, perspective view of the torch base seen in FIG. 7.

Referring now to FIGS. 7 and 8, another embodiment of the torch base will be discussed, which is identified by the reference character 3000. The torch base 3000 is substantially similar to the torch bases 1000 (FIGS. 1-4), 2000 (FIGS. 5, 6) in both structure and function. As such, identical reference characters will be used to identify components common to the torch bases 1000, 2000, 3000. In the interest of brevity, certain components and features common to the torch bases 1000, 2000, 3000 may be omitted from the following discussion.

The torch base 3000 includes a body 500, which supports the temperature reader 200 (FIG. 1) and the control unit 300 in a manner similar (if not identical) to that discussed above in connection with the torch bases 1000, 2000. The body 500 defines a receptacle 508 that is configured to accommodate (receive) the torch T such that the torch T is connectable to and disconnectable from the torch base 3000.

The receptacle 508 extends axially and laterally (radially) inward into the body 500 along the longitudinal axis Y and a transverse axis X that extends in orthogonal relation to the longitudinal axis Y, thereby imparting (generally) C-shaped configurations to the receptacle 508 and the torch base 3000 such that the body 500 defines opposing terminal ends 542, 544. The receptacle includes a sidewall 514, which extends between the terminal ends 542, 544 and defines the chamber 118.

During insertion of the torch T into the receptacle 508, due to the larger transverse cross-sectional dimension Dt (FIG. 5) defined by the torch T (compared to the transverse cross-sectional dimension Dc defined by the chamber 118), the receptacle 508 is expanded radially outward (in the direction indicated by arrows 3), thereby increasing separation (spacing, distance) between the terminal ends 542, 544 of the body 500 as the torch base 3000 moves from a normal (initial) position (configuration) (FIGS. 7, 8) into a deflected (subsequent) position (configuration). Movement of the torch base 3000 between the normal and deflected positions is facilitated via the inclusion of one or more resilient materials in construction of the body 500, as discussed above in connection with the torch bases 1000, 2000. In the deflected position, the body 500 applies the (aforedescribed) inwardly-directed retention force F to the torch T, which secures the torch T within the torch base 3000 to inhibit (if not entirely prevent) unintended (e.g., accidental) relative movement therebetween.

In certain embodiments of the disclosure, it is envisioned that movement of the torch base 3000 between the normal and deflected positions may be further facilitated by the inclusion of a living hinge (or other such weakened section of the body 100). Additionally, or alternatively, it is envisioned that the body 500 may include one or more bearing surfaces to not only guide the torch T into the receptacle 508, but facilitate expansion of the body 500.

In certain embodiments of the disclosure, it is envisioned that the torch base 3000 may include one or more gripping members (or surfaces) to enhance contact between the body 500 and the torch T. For example, it is envisioned that the body 500 may include one or more knurled surfaces, one or more rubberized (gripping) members, etc., which may be provided in any suitable location (e.g., on the sidewall 514).

While the receptacles 108 (FIGS. 1-4), 408 (FIGS. 5, 6), 508 (FIGS. 7, 8) are each illustrated and described above as including a fixed configuration, which allows for insertion of the torch T in a predetermined orientation, in alternate embodiments of the disclosure, it is envisioned that the receptacles 108, 408, 508 may include a variable configuration to allow for articulation of the torch T and positioning of the torch T in a variety of orientations. In such embodiments, it is envisioned that the receptacles 108, 408, 508 may be configured to allow for movement of the torch T in relation to the respective torch bases 1000, 2000, 3000 when positioned within the receptacles 108, 408, 508 (e.g., to allow for heating of the article from a variety of angles). For example, it is envisioned that the torch bases 1000, 2000, 3000 may include a gimbal assembly or other such suitable mechanism.

To further increase utility of the torch bases 1000 (FIGS. 1-4), 2000 (FIGS. 5, 6), 3000 (FIGS. 7, 8) and allow for use with a wider variety of torches T, it is envisioned that an adapter may be provided for insertion into the respective receptacles 108, 408, 508. In such embodiments, the adapter may be utilized to increase or decrease the capacity of the chamber 118 (e.g., to allow for use with torches T having large and smaller transverse cross-sectional dimensions Dt) and/or to allow for use with torches T that may include a variety of configurations. For example, it is envisioned that the adapter may include a male end with a first (e.g., annular) configuration corresponding to that defined by the chamber 118 so as to facilitate insertion of the adapter into the receptacles 108, 408, 508 and a female end with a second (e.g., non-annular) configuration corresponding to that defined by the torch T so as to facilitate insertion of the torch T into the adapter.

While the present disclosure has been described in connection with certain embodiments, it is to be understood that the present disclosure is not to be limited to the disclosed embodiments, but, on the contrary, is intended to cover various modifications and equivalent arrangements included within the scope of the appended claims, which scope is to be accorded the broadest interpretation so as to encompass all such modifications and equivalent structures as is permitted under the law.

Persons skilled in the art will understand that the various embodiments of the present disclosure and shown in the accompanying figures constitute non-limiting examples, and that additional components and features may be added to any of the embodiments discussed hereinabove without departing from the scope of the present disclosure. Additionally, persons skilled in the art will understand that the elements and features shown or described in connection with one embodiment may be combined with those of another embodiment without departing from the scope of the present disclosure to achieve any desired result and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the present disclosure, as are alternative embodiments that may result from combining, integrating, and/or omitting features from any of the disclosed embodiments.

Use of the term "optionally" with respect to any element of a claim means that the element may be included or omitted, with both alternatives being within the scope of the claim. Additionally, use of broader terms such as "comprises," "includes," and "having" should be understood to provide support for narrower terms such as "consisting of," "consisting essentially of," and "comprised substantially of." Accordingly, the scope of protection is not limited by the description set out above, but is defined by the claims that follow, and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," "horizontal," "vertical," etc., should be understood to describe a relative relationship between the structures and/or a spatial orientation of the structures. Those skilled in the art will also recognize that the use of such terms may be provided in the context of the illustrations provided by the corresponding figure(s).

Throughout the present disclosure, terms such as "support," "secure," "mount," "engage," "contact," and "connect" (and variations thereof) may be used interchangeably and should each be understood as referring to a physical interface between the pertinent structures and/or components. Additionally, terms such as "approximately," "generally," "substantially," and the like should be understood to allow for variations in any numerical range or concept with which they are associated. For example, it is intended that the use of terms such as "approximately" and "generally" should be understood to encompass variations on the order of 25%, or to allow for manufacturing tolerances and/or deviations in design.

Although terms such as "first," "second," "third," etc., may be used herein to describe various operations, elements, components, regions, and/or sections, these operations, elements, components, regions, and/or sections should not be limited by the use of these terms in that these terms are used to distinguish one operation, element, component, region, or section from another. Thus, unless expressly stated otherwise, a first operation, element, component, region, or section could be termed a second operation, element, component, region, or section without departing from the scope of the present disclosure.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. A torch base comprising:
   a body configured for releasable connection to a torch, the body including a receptacle defining a chamber configured to removably receive the torch such that the torch is repeatably connectable to and disconnectable from the body;
   a temperature reader connected to the body and configured to measure a surface temperature of an article heated by the torch; and
   a control unit supported by the body, the control unit being in communication with the temperature reader and configured to display the surface temperature measured by the temperature reader.

2. The torch base of claim 1, wherein the temperature reader is variable in length.

3. The torch base of claim 1, wherein the control unit includes a plurality of control buttons to allow for input of a target temperature.

4. The torch base of claim 3, wherein the control unit is configured to provide an alert when the surface temperature measured by the temperature reader reaches the target temperature.

5. The torch base of claim 4, wherein the control unit is configured to provide at least one of a visual alert and an audible alert.

6. The torch base of claim 1, wherein the body includes:
   a lower housing; and
   an upper housing configured for releasable connection to the lower housing, the upper housing defining the receptacle.

7. The torch base of claim 6, wherein the lower housing includes at least one retention member configured for contact with the torch during insertion.

8. The torch base of claim 7, wherein the lower housing includes a plurality of retention members spaced approximately equidistant from each other.

9. The torch base of claim 7, wherein the receptacle includes a sidewall defining at least one aperture configured to receive the at least one retention member such that the at least one retention member extends into the chamber to facilitate contact between the at least one retention member and the torch during insertion.

10. The torch base of claim 7, wherein the lower housing includes a resilient material to allow for deflection of the at least one retention member between a normal position and a deflected position during insertion of the torch, the at least one retention member applying an inwardly-directed retention force to the torch in the deflected position to thereby secure the torch within the receptacle.

11. The torch base of claim 10, wherein the lower housing and the upper housing are each unitary in construction.

12. The torch of claim 10, wherein the upper housing defines an internal cavity adjacent to the receptacle such that the at least one retention member moves through the internal cavity during deflection.

13. A torch base comprising:
   a body configured for releasable connection to a torch, the body including at least one retention member configured for resilient repositioning between a normal position, in which the at least one retention member is positioned for contact with the torch, and a deflected position, in which the at least one retention member contacts the torch and applies an inwardly-directed retention force thereto to secure the torch in relation to the body;
   a temperature reader connected to the body and configured to measure a surface temperature of an article heated by the torch; and
   a control unit supported by the body, the control unit being in communication with the temperature reader and configured to display the surface temperature measured by the temperature reader.

14. The torch base of claim 13, wherein the body includes a receptacle defining a chamber configured to removably receive the torch, the at least one retention member extending into the chamber in the normal position to facilitate contact with the torch during insertion.

15. The torch base of claim 14, wherein the body includes at least one aperture configured to receive the at least one retention member such that the at least one retention member extends into the chamber through the at least one aperture.

16. The torch base of claim 15, wherein the body includes:
   an upper housing including the receptacle; and
   a lower housing including the at least one retention member.

17. The torch base of claim 16, wherein the upper housing and the lower housing are each unitary in construction.

18. A torch base comprising:
   a body configured for releasable connection to a torch, the body including:
      an upper housing including a receptacle defining a chamber configured to removably receive the torch; and
      a lower housing including a plurality of deflectable fingers configured for engagement with the torch during insertion to thereby secure the torch within the torch base;
   a temperature reader connected to the body and configured to measure a surface temperature of an article heated by the torch; and
   a control unit supported by the body, the control unit being in communication with the temperature reader and configured to display the surface temperature measured by the temperature reader.

19. The torch base of claim 18, wherein the receptacle includes a sidewall defining a plurality of apertures configured to receive the plurality of deflectable fingers such that the plurality of deflectable fingers extend into the chamber to facilitate engagement with the torch during insertion.

20. The torch base of claim 18, wherein the upper housing and the lower housing are each unitary in construction.

* * * * *